United States Patent Office  
3,078,280  
Patented Feb. 19, 1963

3,078,280
POLYMERIZATION PRODUCTS OF EPIHALOGEN-OHYDRINS CONTAINING AN EPOXY GROUP IN THEIR MOLECULE AND PROCESS OF MAKING SAME
Theodor Ploetz, Hoesel, Kreis Mettmann, and Hermann Richtzenhain, Koln-Suelz, Germany, assignors to Feldmuehle, Papier- und Zellstoffwerke Aktiengesellschaft, Duesseldorf-Oberkassel, Germany, a company of Germany
No Drawing. Filed Dec. 16, 1959, Ser. No. 859,855
Claims priority, application Germany Dec. 22, 1958
11 Claims. (Cl. 260—348)

The present invention relates to new low molecular polymerization products of epihalogenohydrins containing an epoxy group in their molecule, and to a process of making the same.

Processes are known according to which epichlorohydrin and other compounds containing an epoxy group in their molecule can be polymerized with the addition of catalytically active agents, such as boron trifluoride, aluminum chloride, stannic chloride, and the like. The polymerization products obtained thereby are free of epoxy groups.

It is one object of the present invention to provide new low molecular polymerization products of epihalogenohydrins which still contain an epoxy group in their molecule.

Another object of the present invention is to provide new and valuable polymerization products containing the functional epoxy group and halogen atoms in their molecule.

Still another object of the present invention is to provide a simple and effective process of producing such polymerization products.

These and other objects of the present invention and advantageous features thereof will become apparent as the description proceeds.

According to the present invention it has been found that epihalogenohydrins having the general formula

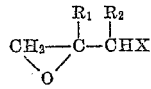

wherein $R_1$ and $R_2$ are hydrogen, alkyl radicals, cycloalkyl radicals, or aryl radicals and preferably lower alkyl radicals with 1 to 5 carbon atoms or the phenyl radical which may be substituted by lower alkyl radicals and/or which may be hydrogenated, while
X is halogen and preferably chlorine, can be polymerized in a completely different manner by heating such epihalogenohydrin compounds with catalytically active compounds of metals of the second group of the periodic system, preferably with the oxides, carbonates, basic carbonates, silicates, and chlorides of magnesium or zinc or with mixtures of such compounds.

In contrast to the heretofore known polymerization products of epihalogenohydrins which do not contain an epoxy group in their molecule, the products prepared according to the present invention still contain such an epoxy group. As is evident from the following examples, the new polymerization products consist mainly of dimeric and trimeric epihalogenohydrins. In order to illustrate the composition of the products according to the present invention, the reaction equation for the formation of the dimeric compound is given hereinafter as follows:

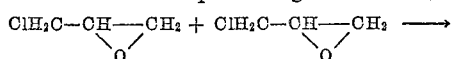

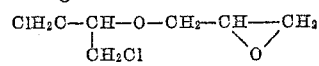

The known polymerization products obtained by using boron trifluoride, aluminum chloride, stannic chloride and the like catalysts have an entirely different configuration and contain only polyether chains as is evident from the following structure:

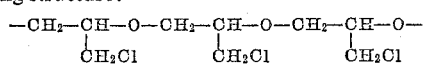

The amount of the catalytically active compound used in the polymerization process according to the present invention can be varied within wide limits. In general, amounts between 1% and 20% are used and amounts of about 10% of the weight of the epihalogenohydrin reacted are sufficient. The activity of the catalytically effective compounds as far as they are insoluble in the epihalogenohydrin, depends not only upon their chemical nature but also upon the nature of their surface. Compounds having the largest surface area per unit of weight have proved to be most effective.

Reaction of the epihalogenohydrin is carried out at moderately increased temperatures. Generally temperatures between 100° C. and 200° C. are sufficient. The reaction can be carried out in continuous operation whereby, of course, uniform distribution of the catalyst in the epihalogenohydrin must be effected.

The epihalogenohydrin mentioned above as starting materials can be co-polymerized with other epoxides of the formula

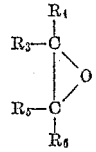

in which $R_3$, $R_4$, $R_5$, and $R_6$ represent hydrogen or alkyl radicals and more particularly lower alkyl radicals with 1 to 5 carbon atoms.

The resulting polymerization products are, for instance, valuable plasticizers and stabilizers, for instance, for polyvinyl chloride, chlorinated rubber, and the like chlorine containing plastics. The functional groups present therein, i.e. the halogen atoms and the epoxy group render them suitable for further reactions.

The following examples serve to illustrate the present invention without, however, limiting the same thereto. In these examples the amounts are given in parts by weight.

*Example 1*

100 parts of epichlorohydrin and 8 parts of basic magnesium carbonate $MgCO_3 \cdot Mg(OH)_2$ are heated to 120° C. for 48 hours while stirring. The catalyst is filtered off, washed with epichlorohydrin and is again used in a new batch. Unreacted epichlorohydrin is distilled off from the yellowish filtrate. 89 parts of a polymer mixture are obtained from which the following polymers can be isolated by repeated fractional distillation in a vacuum:

(a) 36% of pure dimeric epichlorohydrin. Colorless liquid, boiling point: 81° C./0.3 mm.; $n_D^{20}=1.4767$.

Analysis: $C_6H_{10}O_2Cl_2$: Calculated: 38.9% C; 5.4% H; 38.3% Cl; epoxide equivalent: 185. Found: 38.8% C; 5.4% H; 38.2% Cl; epoxide equivalent: 187.

(b) 28% of pure trimeric epichlorohydrin. Light yellow viscous liquid; boiling point: 154-160° C./0.3 mm.; $n_D^{20}=1.4902$. Analysis: $C_9H_{15}O_3Cl_3$: Calculated: 38.9% C; 5.4% H; 38.3% Cl; epoxide equivalent 277.5. Found: 38.7% C; 5.6% H; 38.0% Cl; epoxide equivalent: 282.

(c) 23% of an intermediate fraction which can be recycled and added, when distilling further batches.

(d) 12% of a very viscous residue consisting of higher polymers of epichlorohydrin; boiling point: 200° C./0.1 mm.; epoxy equivalent: >1075.

*Example 2*

100 parts of epichlorohydrin and 10 parts of zinc carbonate are heated to 120° C. for 48 hours while stirring. On working up the reaction mixture according to Example 1, 21 parts of a mixture of crude polymerization products are obtained from which the corresponding pure fractions (a) to (d) are obtained by fractional distillation in a vacuum.

*Example 3*

100 parts of epichlorohydrin and 20 parts of magnesium silicate are heated to 120° C. for 48 hours while stirring. On working up the reaction mixture according to Example 1, 10 parts of a mixture consisting of crude polymerization products are obtained from which the corresponding pure fractions (a) to (d) can be obtained by fractional distillation in a vacuum.

*Example 4*

100 parts of epichlorohydrin and 1 part of anhydrous magnesium chloride are heated to 120° C. for 48 hours while stirring. After filtering off a small amount of undissolved matter, excess epichlorohydrin is distilled off. 41 parts of a mixture consisting of crude polymerization products are obtained from which the pure fractions (a) to (d) are obtained by fractional distillation in a vacuum.

In place of epichlorohydrin as used in the preceding examples, there may be employed equimolecular amounts of other epihalogenohydrins such as epibromohydrin and epiiodohydrin while otherwise the procedure is the same as described in said examples. Likewise, other epichlorohydrins wherein $R_1$ and/or $R_2$ are alkyl, cycloalkyl, or aryl radicals, such as 1,2-epoxy butylchloride-(3); 2-methyl-1,2-epoxy propylchloride-(3); 2-phenyl-1,2-epoxy propylchloride-(3); 1,2-epoxy-3-phenyl propylchloride-(3); 2-methyl-3-phenyl-1,2-epoxy propylchloride-(3) and others can be used as starting material. Epichlorohydrin, however, is the preferred reactant due to its ready availability and low price.

In place of zinc carbonate and the magnesium salts used as catalysts in the preceding examples, there may be employed the same amounts of other catalytically effective compounds of metals of the II group of the periodic system, such as magnesium oxide, zinc oxide, zinc chloride, or the corresponding alkaline earth metal compounds, or cadmium compounds. Magnesium and zinc compounds, however, have proved to be especially suitable and are the preferred catalytic agents.

Epoxides which may be added during polymerization of the epihalogenohydrins according to the present invention and which yield valuable copolymerization products are, for instance, ethylene oxide, propylene oxide, trimethylene oxide, tetrahydrofuran, 1,2-epoxy butane, 2-methyl-1,2-epoxy butane, pentamethylene oxide, 2,3-epoxy pentane, styrene oxide, 2-phenyl-1,2-epoxy propane, and others. By varying the amounts of the epoxide compounds added to the polymerization mixture it is possible to vary the properties of the resulting copolymerization products.

The preferred reaction temperature is a temperature of about 120° C. Higher temperatures produce more of the high molecular polymer while a lower polymerization temperature prolongs the polymerization time very considerably. Temperatures below 100° C. are in general unsuitable.

As stated above, the new polymerization products are valuable plasticizers and stabilizers for chlorine containing polymers. They exhibit in this respect a similar behavior as the liquid epoxies. They may also be used as intermediates in the manufacture of glycidol-like compounds by replacing the chlorine atoms by hydroxyl groups. Furthermore, they are useful as one of the reaction components in the manufacture of epoxy resins whereby they may replace epichlorohydrin partly or completely.

Of course, many changes and variations may be made in the reaction conditions, temperature and duration, in the catalysts used in the methods of working up the polymerization products and of isolating the dimeric, trimeric, and polymeric reaction products from the polymerization mixture, and the like in accordance with the principles set forth herein and in the claims annexed hereto.

We claim:

1. The dimeric polymerization product of epichlorohydrin of the formula

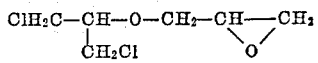

being a colorless liquid having a boiling point of about 81° C./0.3 mm. and an index of refraction $n_D^{20}=1.4767$.

2. The trimeric polymerization product of epichlorohydrin of the formula

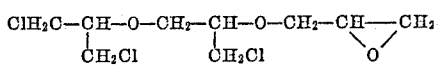

being a light yellow viscous liquid having a boiling point of about 154-160° C./0.3 mm. and an index of refraction $n_D^{20}=1.4902$.

3. The polymerization product of epichlorohydrin containing a termianl epoxy group of the formula

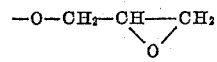

a terminal methyl substituted by two chloro methyl groups, said substituted terminal methyl group being of the formula

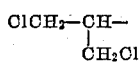

and intermediate units forming the polymer chain of the formula

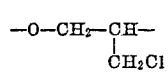

said polymerization product being a viscous product of the boiling point of about 200° C./0.1 mm.

4. The copolymerization product of an epihalogenohydrin of the formula

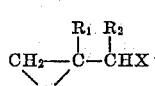

wherein $R_1$ and $R_2$ indicate members selected from the group consisting of hydrogen, lower alkyl, phenyl, cyclohexyl, and phenyl and cyclohexyl substituted by lower alkyl, and X indicates a halogen selected from the group consisting of chlorine, bromine, and iodine, and an epoxide of the formula

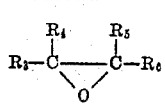

wherein $R_3$, $R_4$, $R_5$, and $R_6$ indicate members selected from the group consisting of hydrogen and a lower alkyl, said copolymerization product containing a terminal epoxy group in its molecule, said copolymerization product being produced by heating a mixture of said epihalogenohydrin and said epoxide at a temperature between about 100° C. and about 200° C. with the addition of a catalytically active compound selected from the group consisting of the oxide, carbonate, basic carbonate, silicate, and chloride of a metal of the second group of the periodic system for a period of time sufficient to produce a liquid copolymerization product but insufficient to cause formation of a solid product.

5. In a process of producing liquid polymerization products of an epihalogenohydrin of the formula

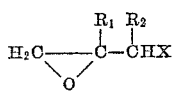

wherein $R_1$ and $R_2$ indicate members selected from the group consisting of hydrogen, lower alkyl, phenyl, cyclohexyl, and phenyl and cyclohexyl substituted by lower alkyl, and X indicates a halogen selected from the group consisting of chlorine, bromine, and iodine, said polymerization products having a terminal epoxy group and a terminal methyl carrying two

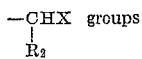

the step which consists in heating said epihalogenohydrin at a temperature between about 100° C. and about 200° C. with the addition of a catalytically active compound selected from the group consisting of the oxide, carbonate, basic carbonate, silicate, and chloride of a metal of the second group of the periodic system for a period of time sufficient to produce a liquid polymerization product but insufficient to cause formation of a solid polymerization product.

6. In a process of producing liquid polymerization products of epichlorohydrin, said polymerization products having a terminal epoxy group and a terminal methyl carrying two chloro methyl groups, the step which consists in heating said epichlorohydrin at a temperature between about 100° C. and about 200° C. with the addition of a catalytically active compound selected from the group consisting of the oxide, carbonate, basic carbonate, silicate, and chloride of a metal of the second group of the periodic system for a period of time sufficient to produce a liquid polymerization product but insufficient to cause formation of a solid product.

7. In a process of producing liquid coopolymerization products of an epihalogenohydrin of the formula

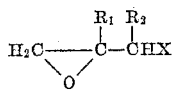

wherein $R_1$ and $R_2$ indicate members selected from the group consisting of hydrogen, lower alkyl, phenyl, cyclohexyl, and phenyl and cyclohexyl substituted by lower alkyl, and X indicates a halogen selected from the group consisting of chlorine, bromine, and iodine, and and epoxide of the formula

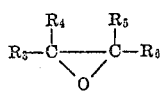

wherein $R_3$, $R_4$, $R_5$, and $R_6$ indicate members selected from the group consisting of hydrogen and lower alkyl, said copolymerization products having a terminal epoxy group in their molecule, the step which consists in heating a mixture of said epihalogenohydrin and said epoxide at a temperature between about 100° C. and about 200° C. with the addition of a catalytically active compound selected from the group consisting of the oxide, carbonate, basic carbonate, silicate, and chloride of a metal of the second group of the periodic system for a period of time sufficient to produce a liquid copolymerization product but insufficient to cause formation of a solid product.

8. In a process of producing liquid polymerization products of an epihalogenohydrin of the formula

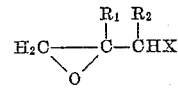

wherein $R_1$ and $R_2$ indicate members selected from the group consisting of hydrogen, lower alkyl, phenyl, cyclohexyl, and phenyl and cyclohexyl substituted by lower alkyl, and X indicates a halogen selected from the group consisting of chlorine, bromine, and iodine, said polymerization products having a terminal epoxy group and terminal methyl, its carbon atom carrying two

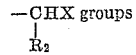

the step which consists in heating said epihalogenohydrin at a temperature between about 100° C. and about 200° C. with the addition of catalytically active basic magnesium carbonate for a period of time sufficient to produce a liquid polymerization product but insufficient to cause formation of a solid polymerization product.

9. In a process of producing liquid polymerization products of an epihalogenohydrin of the formula

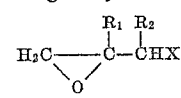

wherein $R_1$ and $R_2$ indicate members selected from the group consisting of hydrogen, lower alkyl, phenyl, cyclohexyl, and phenyl and cyclohexyl substituted by lower alkyl, and X indicates a halogen selected from the group consisting of chlorine, bromine, and iodine, said polymerization products having a terminal epoxy group and terminal methyl, its carbon atom carrying two

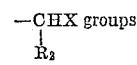

the step which consists in heating said epihalogenohydrin at a temperature between about 100° C. and about 200° C. with the addition of catalytically active zinc carbonate for a period of time sufficient to produce a liquid polymerization product but insufficient to cause formation of a solid polymerization product.

10. In a process of producing liquid polymerization products of an epihalogenohydrin of the formula

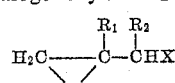

wherein $R_1$ and $R_2$ indicate members selected from the group consisting of hydrogen, lower alkyl, phenyl, cyclohexyl, and phenyl and cyclohexyl substituted by lower alkyl, and X indicates a halogen selected from the group consisting of chlorine, bromine, and iodine, said polymerization products having a terminal epoxy group and terminal methyl, its carbon atom carrying two

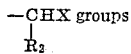

the step which consists in heating said epihalogenohydrin at a temperature between about 100° C. and about 200° C. with the addition of catalytically active magnesium chloride for a period of time sufficient to produce a liquid polymerization product but insufficient to cause formation of a solid polymerization product.

11. In a process of producing liquid polymerization products of an epihalogenohydrin of the formula

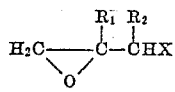

wherein $R_1$ and $R_2$ indicate members selected from the group consisting of hydrogen, lower alkyl, phenyl, cyclohexyl, and phenyl and cyclohexyl substituted by lower alkyl, and X indicates a halogen selected from the group consisting of chlorine, bromine, and iodine, said polymerization products having a terminal epoxy group and terminal methyl, its carbon atom carrying two

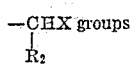

the step which consists in heating said epihalogenohydrin to about 120° C. for about 48 hours while stirring.

References Cited in the file of this patent

UNITED STATES PATENTS

| | | |
|---|---|---|
| 2,106,347 | Groll et al. | Jan. 25, 1938 |
| 2,498,195 | Ballard et al. | Feb. 21, 1950 |
| 2,581,464 | Zech | Jan. 8, 1952 |
| 2,706,189 | Pruitt et al. | Apr. 12, 1955 |
| 2,712,000 | Zech | June 28, 1955 |
| 2,870,099 | Borrows et al. | Jan. 20, 1959 |
| 2,871,219 | Baggett et al. | Jan. 27, 1959 |
| 2,873,258 | Borkovec | Feb. 10, 1959 |
| 2,891,073 | Smith | June 16, 1959 |
| 2,911,377 | Gurgiolo et al. | Nov. 3, 1959 |
| 2,914,491 | Bailey | Nov. 24, 1959 |
| 2,917,470 | Bresler et al. | Dec. 15, 1959 |
| 2,934,505 | Gurgiolo | Apr. 26, 1960 |
| 2,951,854 | Chiddix et al. | Sept. 6, 1960 |
| 2,987,489 | Bailey et al. | June 6, 1961 |
| 3,004,996 | Arakelian et al. | Oct. 17, 1961 |

FOREIGN PATENTS

| | | |
|---|---|---|
| 477,843 | Great Britain | Jan. 3, 1938 |
| 751,244 | Great Britain | June 27, 1956 |
| 966,389 | France | Mar. 1, 1950 |
| 199,877 | Austria | Sept. 25, 1958 |